Oct. 19, 1937.　　　　　R. B. SMITH　　　　2,096,700
ART OF RECOVERING HYDROCARBONS
Filed Nov. 14, 1931
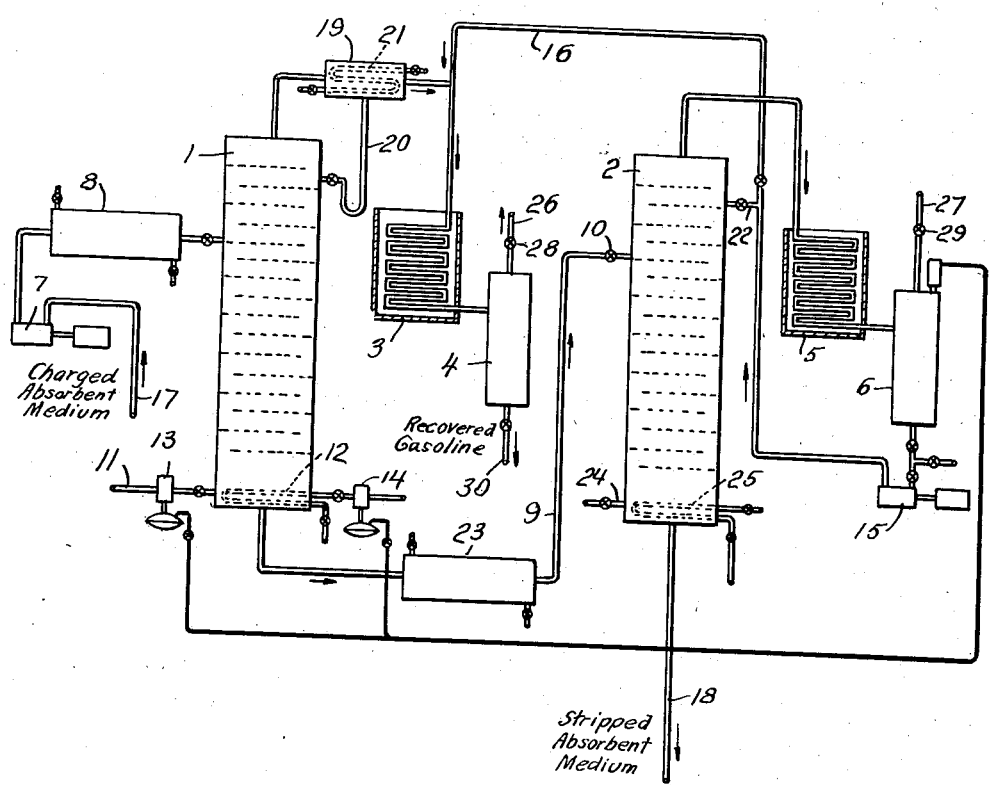
INVENTOR
Reading B. Smith
BY
ATTORNEYS Patented Oct. 19, 1937

2,096,700

UNITED STATES PATENT OFFICE 2,096,700

ART OF RECOVERING HYDROCARBONS

Reading Barlow Smith, Whiting, Ind., assignor to Sinclair Refining Company, New York, N. Y., a corporation of Maine Application November 14, 1931, Serial No. 574,986

4 Claims. (Cl. 196—8)

This invention relates to improvements in stripping absorbed gasoline from absorbent media, such as higher boiling hydrocarbon oils, and in apparatus therefor. Gasoline is commonly recovered from hydrocarbon gas and vapor mixtures by absorption in an absorbent medium from which it is subsequently stripped, the absorbent medium being used cyclically. The invention is of general application in this connection and affords important advantages with respect to efficiency, economy and simplification of control.

In accordance with this invention, the absorbent medium charged with absorbed gasoline is supplied to the first of two separators under superatmospheric pressure and at a temperature high enough to vaporize a part of the absorbed gasoline from the absorbent medium under the pressure prevailing in the first separator, the partially stripped absorbent medium is transferred, with reduction of pressure, from the first separator to the second of the two separators in which the remaining part of the absorbed gasoline to be vaporized is vaporized under a lower pressure, the gasoline vaporized in each of the two separators is taken off and condensed and the condensed gasoline is collected under substantially the pressure prevailing in the two separators, respectively. That is, absorbed gasoline is vaporized from the absorbent medium in two successive stages, in the first under a superatmospheric pressure and in the second under a lower pressure, and the vapors separated in each of the stages are condensed and the resulting condensate is collected under substantially the pressure prevailing in each of the stages, respectively. Normally incondensable vapors and gases contained in the charged absorbent medium are vaporized therefrom in the first separator, and the gasoline condensed from the vapors taken off from this first separator is separated from such vapors and gases remaining uncondensed under substantially the pressure prevailing in the first separator. The vapors vaporized from the absorbent medium in the second separator are normally substantially free from such incondensable vapors and gases. The operation is controlled by regulating automatically, the proportionate vaporization in the first stage with reference to the vapor pressure of the condensate separated in the second stage by increasing this vaporization as this vapor pressure increases and decreasing this vaporization as this vapor pressure decreases. The ratio between the part of the absorbed gasoline vaporized in the first separator and the part of the absorbed gasoline vaporized in the second separator is regulated with reference to the vapor pressure of the condensate condensed from the vapors separated in the second separator, this ratio being increased as this pressure increases and being decreased as this pressure decreases. The condensate condensed from the vapors taken off from the second separator is, with advantage, supplied with the vapors taken off from the first separator, to the condensing operation to which these last mentioned vapors are subjected.

The invention will be further described in connection with the accompanying drawing which illustrates one form of apparatus embodying the invention. This apparatus illustrated includes several features which may be included or omitted, as will be noted. It will also be understood that the invention may be embodied in other and different forms of apparatus.

Referring to the drawing, the apparatus illustrated comprises primary and secondary separators, stripping tower 1 and stripping tower 2 respectively, a condenser 3 and a receiver 4 connected to the stripping tower 1 and a condenser 5 and a receiver 6 connected to the stripping tower 2, a pump 7 for supplying the charged absorbent medium to the stripping tower 1, through an appropriate heat exchanger 8, if necessary, to bring the charged absorbent medium to an appropriate temperature, a connection 9 including a pressure reducing valve 10 for transferring the partially stripped absorbent medium from the stripping tower 1 to the stripping tower 2, and means for regulating the supply, for example, of stripping steam through connection 11 to the lower end of the stripping tower 1 or the circulation of a heating medium through the heating coil 12 in the lower end of the stripping tower 1 with reference to the vapor pressure in the receiver 6, these means being adapted to increase the supply of stripping steam or to increase the rate of circulation of the heating medium as this pressure increases and to decrease the supply of stripping steam or to decrease the rate of circulation of the heating medium as this pressure decreases. The means illustrated comprise pressure actuated valves 13 and 14, either of which may be used, the actuating mechanisms of which are connected to the vapor space of the receiver 6. The apparatus illustrated also includes pump 15 for supplying condensate from the receiver 6 through connection 16 to the condenser 3.

The charged absorbent medium from the absorption system is supplied to the stripping apparatus illustrated through connection 17 and the stripped absorbent medium is returned from the stripping apparatus illustrated to the absorption system through connection 18.

To supplement control of the stripping tower 1, a part of the vapors escaping from the stripping tower 1 to the condenser 3 may be condensed in the partial condenser 19 and returned to the upper end of the stripping tower 1 through connection 20 by controlled circulation of a cooling medium through the cooling coil 21. This partial condenser is not essential to the invention. To supplement control of the stripping tower 2, a part of the condensate separated in the receiver 6 may be reintroduced into the upper end of the stripping tower 2 through connection 22. This is not essential to the invention. A heat exchanger 23 may be provided to increase the temperature of the partially stripped absorbent medium passing from the stripping tower 1 to the stripping tower 2 through connection 9. This heat exchanger is not essential to the invention. Connection 24 may be provided for supplying, for example, stripping steam to the lower end of the stripping tower 2. Heating coil 25 may be provided in the lower end of the stripping tower 2 to promote the stripping operation.

Uncondensed vapors and gases are discharged from the receiver 4 through connection 26, valve 28 being arranged in this connection. Recovered gasoline is discharged from receiver 4 through connection 30. Vent line 27, including valve 29, is normally closed but is provided for use in emergency. The vapors escaping from the stripping tower 2 are normally condensed substantially completely in the condenser 5. The vapors occupying the vapor space in the receiver 6 normally constitute that mixture in equilibrium with the condensate collected therein, part of the condensate being vaporized or part of the vapors being condensed as the pressure therein decreases or increases, respectively, but these vapors are not normally discharged therefrom as vapors.

In operation, once conditions of equilibrium are established, the apparatus becomes largely self-controlled. For example, assuming the stripping tower 1 to be operated under a pressure approximating 100 pounds per square inch and the stripping tower 2 to be operated under a pressure approximating an average of 10 pounds per square inch, any decrease in the proportionate stripping effected in the stripping tower 1 results in an increase of the vapor pressure in the receiver connected to the stripping tower 2 to some pressure higher than 10 pounds per square inch which in turn results in an adjustment of the conditions in the stripping tower 1 to increase the proportionate stripping effected therein. Similarly, any increase in the proportionate stripping effected in the stripping tower 1 results in a decrease in the vapor pressure in the receiver connected to the stripping tower 2 to some pressure lower than 10 pounds per square inch which in turn results in an adjustment of the conditions in the stripping tower 1 to decrease the proportionate stripping effected therein. Thus, a uniform stripping of the circulating absorbent medium is accomplished with a minimum of manual regulation.

The pressure in the receiver 6, in the apparatus illustrated, will be somewhat less than the pressure in the stripping tower 2 due to the pressure drop through the condenser 5 and the connections between the stripping tower, the condenser and the receiver and, similarly, the pressure in the receiver 4 will be somewhat less than the pressure in the stripping tower 1. In both cases however the receiver is maintained in open communication with the stripping tower to which it is connected so that the pressure in the receiver is substantially the pressure prevailing in the stripping tower to which it is connected.

The gasoline separated from the absorbent medium in the stripping tower 1 includes the lighter constituents of the absorbed gasoline. A maximum recovery of these lighter constituents of the gasoline to be recovered is promoted by condensing this part of the separated gasoline and separating the condensed gasoline from uncondensed vapors and gases under a pressure approximating that prevailing in the stripping tower 1. Where the condensed gasoline separated from the absorbent medium in the stripping tower 2 is supplied, through the condenser 3, to the receiver in which this separation of uncondensed vapors and gases from the condensed gasoline is effected under superatmospheric pressure, a further improvement in recovery is secured.

The uncondensed vapors and gases discharged through connection 26 from the receiver 4 may, with advantage, be returned to the absorption system.

It will be understood that stripping steam, for example, supplied through connection 11 may be supplied at higher temperature than that prevailing in the lower end of the stripping tower 1, at substantially the same temperature or at a lower temperature, stripping of the absorbent medium being promoted by the partial pressure effect of steam passing in direct contact with the absorbent medium through the stripping tower even though the steam be at lower temperature.

I claim:

1. In stripping absorbent media of absorbed gasoline, the improvement which comprises vaporizing absorbed gasoline from the absorbent medium in two successive stages, in the first under a superatmospheric pressure and in the second under a lower pressure, condensing the vapors separated in the first stage and separating the condensate from uncondensed vapors and gases under substantially the pressure prevailing therein, condensing the vapors separated in the second stage and collecting the condensate under substantially the pressure prevailing therein, and regulating the proportionate vaporization in the first stage with reference to the vapor pressure of the condensate separated in the second stage by increasing this vaporization as this vapor pressure increases and decreasing this vaporization as this vapor pressure decreases.

2. In stripping absorbent media of absorbed gasoline, the improvement which comprises vaporizing absorbed gasoline from the absorbent medium in two successive stages, in the first under a superatmospheric pressure and in the second under a lower pressure, condensing the vapors separated in the first stage and separating the condensate from uncondensed vapors and gases under substantially the pressure prevailing therein, condensing the vapors separated in the second stage and collecting the condensate under substantially the pressure prevailing therein, and regulating the proportionate vaporization in the first stage with reference to the vapor pressure of the condensate separated in the second stage by increasing this vaporization as this vapor pressure increases and decreasing this vaporization as this vapor pressure decreases, and combining the condensate separated in the second stage with the vapors separated in the first stage as they undergo condensation.

3. In combination in apparatus for stripping absorbent media of absorbed gasoline, a first separator and a second separator, means for supplying charged absorbent medium to the first separator under superatmospheric pressure, means for heating the absorbent medium supplied to the first separator, means for condensing vapors separated in the first separator and for separating the condensate from uncondensed vapors and gases under substantially the pressure prevailing in the first separator, means for transferring partially stripped absorbent medium from the first separator to the second separator and means for reducing the pressure on the transferred absorbent medium, means for condensing vapors separated in the second separator and for collecting the condensate under substantially the pressure prevailing in the second separator, and means operated by the pressure in the said means for collecting condensate for increasing the ratio between the vapors separated in the first separator and those separated in the second separator when the pressure increases and for decreasing this ratio when the pressure decreases.

4. In combination in apparatus for stripping absorbent media of absorbed gasoline, a first separator and a second separator, means for supplying charged absorbent medium to the first separator under superatmospheric pressure, means for heating the absorbent medium supplied to the first separator, means for condensing vapors separated in the first separator and for separating the condensate from uncondensed vapors and gases under substantially the pressure prevailing in the first separator, means for transferring partially stripped absorbent medium from the first separator to the second separator and means for reducing the pressure on the transferred absorbent medium, means for condensing vapors separated in the second separator and for collecting the condensate under substantially the pressure prevailing in the second separator, means for supplying condensate from the said means for collecting condensate to the first-mentioned condensing means with vapors from the first separator, and means operated by the pressure in the said means for collecting condensate for increasing the ratio between the vapors separated in the first separator and those separated in the second separator when the pressure increases and for decreasing this ratio when the pressure decreases.

READING BARLOW SMITH.